(12) United States Patent
Yu et al.

(10) Patent No.: US 9,284,825 B2
(45) Date of Patent: Mar. 15, 2016

(54) GAS-LIFT SAFETY VALVE ACTUATED BY A SENSOR

(71) Applicants: Chevron U.S.A. Inc., San Ramon, CA (US); Massachusetts Institute of Technology, Cambridge, MA (US)

(72) Inventors: Changkuan Yu, Cambridge, MA (US); Eric Wright Gilbertson, Cambridge, MA (US); Franz Hover, Somerville, MA (US); Dennis Harris, Houston, TX (US); Jose Arellano, Houston, TX (US)

(73) Assignees: Massachusetts Institute of Technology, Cambridge, MA (US); Chevron U.S.A. Inc., San Ramon, CA (US)

( * ) Notice: Subject to any disclaimer, the term of this patent is extended or adjusted under 35 U.S.C. 154(b) by 461 days.

(21) Appl. No.: 13/691,340

(22) Filed: Nov. 30, 2012

(65) Prior Publication Data

US 2014/0150869 A1    Jun. 5, 2014

(51) Int. Cl.
| | |
|---|---|
| *E21B 43/12* | (2006.01) |
| *E21B 44/00* | (2006.01) |
| *F16K 31/02* | (2006.01) |
| *F16K 31/00* | (2006.01) |
| *F16K 17/38* | (2006.01) |

(52) U.S. Cl.
CPC ............ *E21B 43/123* (2013.01); *E21B 44/005* (2013.01); *F16K 17/386* (2013.01); *F16K 31/002* (2013.01); *F16K 31/025* (2013.01); *Y10T 137/0318* (2015.04); *Y10T 137/7737* (2015.04); *Y10T 137/7761* (2015.04)

(58) Field of Classification Search
CPC ....... F16K 31/002; E21B 21/10; E21B 43/12; E21B 43/123; E21B 34/06; E21B 2034/002; F23N 3/047
USPC ............... 251/315.01, 315.06, 129.06, 11; 137/155, 79; 166/319, 325, 372, 373, 166/386
See application file for complete search history.

(56) References Cited

U.S. PATENT DOCUMENTS

| | | | | |
|---|---|---|---|---|
| 4,717,582 | A * | 1/1988 | Kotoye et al. | 427/8 |
| 2009/0139727 | A1 * | 6/2009 | Tanju et al. | 166/373 |
| 2010/0078173 | A1 * | 4/2010 | Buytaert et al. | 166/302 |
| 2012/0253145 | A1 * | 10/2012 | Stafford et al. | 600/309 |

\* cited by examiner

*Primary Examiner* — Marina Tietjen
(74) *Attorney, Agent, or Firm* — Gesmer Updegrove LLP

(57) ABSTRACT

A valve actuator, valve, and method of actuation of a valve are disclosed. The valve actuator includes a shape memory alloy element attachable to a valve body, capable of use with a valve to cause movement of the valve between first and second positions. The valve actuator also includes a sensor located within a well and capable of detecting the presence of a fluid based on a fluid property of the fluid. The valve actuator includes a power supply electrically connected to the sensor and the shape memory alloy element, capable of applying an electric current to the shape memory alloy element in response to the sensor detecting the presence of the fluid. The electric current causes a temperature of the shape memory alloy element to increase beyond a threshold temperature at which the shape memory alloy element actuates.

18 Claims, 12 Drawing Sheets

GAS-LIFT SAFETY VALVE ACTUATED BY A SENSOR

TECHNICAL FIELD

The present disclosure relates generally to gas-lift apparatuses. In particular, the present disclosure relates to a gas-lift safety valve actuated by a sensor.

BACKGROUND

Gas lift is an artificial lifting method used to produce oil from wells that do not flow naturally. In gas-lifted wells, gas is injected through the well annulus and into the well tubing at a down-well location. The gas mixes with the oil in the tubing, aerating the oil and causing it to rise to the surface.

To pass through the annulus to the tubing, the injection gas flows through a valve commonly referred to as a gas lift valve. Gas lift valves are one-way valves that allow gas to pass from the annulus to the tubing but prevent oil from passing through to the annulus. Most valves contain a pressurized bellows and an internal check valve. The bellows opens when the injection gas is pressurized above a threshold value, and the internal check valve prevents oil from passing through the gas lift valve.

A gas lift valve can fail if it allows oil passage from the tubing to the annulus. For failure to occur, at least two conditions are simultaneously met: (1) the reverse-flow check valve has a leak and the tubing pressure exceeds the gas pressure; and (2) a combination of high tubing pressure and low gas pressure allows the bellows valve to open. Further, if both the check valve and the bellows valve leak, then backflow can occur any time the tubing pressure exceeds the annulus pressure. Proper function of gas lift valves is very important for the safety of the well and surface operations. For example, if hydrocarbons flow through the annulus and reach the wellhead, an undesired accumulation of high-pressure combustible materials may occur at the well and surface, and hence may increase the risk of injury to personnel and/or damage to equipment, as well as disruptions in operation. Gas lift valves are thus susceptible to leakage, with seal corrosion being a major contributing factor.

Existing gas-lift safety valve designs can be designed to actuate and close, preventing backflow in the event of a change in temperature at the safety valve. However, these designs have disadvantages. For example, existing designs generally require a temperature difference of at least about 6° C. for actuation. This temperature difference is not always present in the event of a valve leak; therefore, with temperature-based detection of backflow, risk of backflow (or at least delayed response to backflow) remains.

Still further compounding this issue, gradual changes to temperature may occur which are not the result of (and do not signify) leakage of a safety valve. In such circumstances, a gradual rise in temperature over time, which may be attributable to other effects, may be detected by the safety valve as a possible leak, causing the safety valve to actuate and close when no leakage in fact exists. Accordingly, gas-lift safety valve designs experience the dual challenges of being required to actuate accurately when a backflow condition exists (which may have small temperature variation) while not falsely actuating in the event of gradual temperature changes.

SUMMARY

In accordance with the following disclosure, the above and other issues are addressed by the following:

In a first aspect, a valve actuator includes a shape memory alloy element attachable to a valve body, capable of use with a valve to cause movement of the valve between first and second positions responsive to at least a threshold amount of temperature change of the shape memory alloy element. The valve actuator also includes a sensor located within a well, the sensor capable of detecting the presence of a fluid based on a fluid property of the fluid. The valve actuator further includes a power supply electrically connected to the sensor and the shape memory alloy element, the power supply capable of applying an electric current to the shape memory alloy element in response to the sensor detecting the presence of the fluid, the electric current causing a temperature of the shape memory alloy element to increase beyond a threshold temperature at which the shape memory alloy element actuates, thereby causing movement of the valve between the first and second positions.

In a second aspect, a valve includes a valve body located within a well, an orifice within the valve body, and a fluid flow restraining member located at a first location of the orifice and movable between a closed position and an open position. The valve also includes a shape memory alloy element connected to the fluid flow restraining member, the shape memory alloy element causing movement of the fluid flow restraining member between open and closed positions responsive to at least a threshold amount of temperature change of the shape memory alloy element. The valve further includes a sensor located within the orifice, the sensor capable of detecting the presence of a fluid based on a fluid property of the fluid. The valve also includes a power supply electrically connected to the sensor and the shape memory alloy element, the power supply capable of applying an electric current to the shape memory alloy element in response to the sensor detecting the presence of the fluid. The electric current causes a temperature of the shape memory alloy element to increase beyond a threshold temperature at which the shape memory alloy element actuates, thereby causing movement of the valve between first and second positions.

In a third aspect, a method of actuating a valve from an open position to a closed position includes detecting, via a sensor, the presence of a fluid in a valve orifice of a valve, wherein the fluid is detected by measuring a fluid property of the fluid. The method also includes passing an electric current through a shape memory alloy element in response to detecting the presence of the fluid, the shape memory alloy element connected to the fluid flow restraining member of the valve. This increases a temperature of the shape memory alloy element from a first temperature below a threshold temperature to a second temperature above the threshold temperature, thereby actuating movement of the fluid flow restraining member between an open position and a closed position.

BRIEF DESCRIPTION OF THE DRAWINGS

The systems and methods described herein can be better understood with reference to the following drawings. The components in the drawings are not necessarily drawn to scale, emphasis instead being placed upon clearly illustrating the principles of the present disclosure. In the drawings, like reference numerals designate corresponding parts throughout the several views.

DETAILED DESCRIPTION

Disclosed herein are certain embodiments of a thermal actuator implemented using a shape memory alloy (SMA). The thermal actuator can be used as a valve actuator, such as for a gas lift safety valve used in a gas-lifted well. Additionally, thermal signaling in SMA-actuated flow control elements can be applied in a variety of operational scenarios, because no power or communication is needed. To assist the thermal actuation, a sensor can be used to detect a change in a liquid flowing through the gas lift safety valve, triggering a circuit used to assist in actuating the gas-lift safety valve. As such, response time of such a valve can be improved, and false actuations can be drastically reduced.

In some embodiments, the thermal actuator includes a shape memory alloy element attachable to a valve body and capable of use with a valve to cause movement of the valve between first and second positions responsive to a threshold amount of temperature change of the shape memory alloy element. In such embodiments, a negative-differential spring is applied to the shape memory alloy element, thereby reducing the threshold amount of temperature change needed to cause movement of the valve between first and second positions. The thermal actuator provides for a sharp phase change, such that thermally-actuated valves with which it is associated will be applicable to a larger range of applications and available temperature differences. In some such embodiments, a current can be passed through the shape memory alloy if an undesirable condition is detected by a sensor, with the current independently heating the shape memory alloy past an actuation temperature, causing actuation of the valve associated therewith.

These advantages and/or features, among others, are described hereinafter in the context of a gas-lifted oil well environment, with the understanding that other applications and/or environments exist in which such a thermal actuator may be advantageous. Generally, in the context of a gas-lifted oil well, other applications may exist where unsatisfactory consequences of failure of a downstream check valve (integrated or otherwise) may be ameliorated or eliminated using the embodiments described herein. Further, it should be understood by one having ordinary skill in the art that, though specifics for one or more embodiments are disclosed herein, such specifics as described are not necessarily part of every embodiment.

Figure 1:
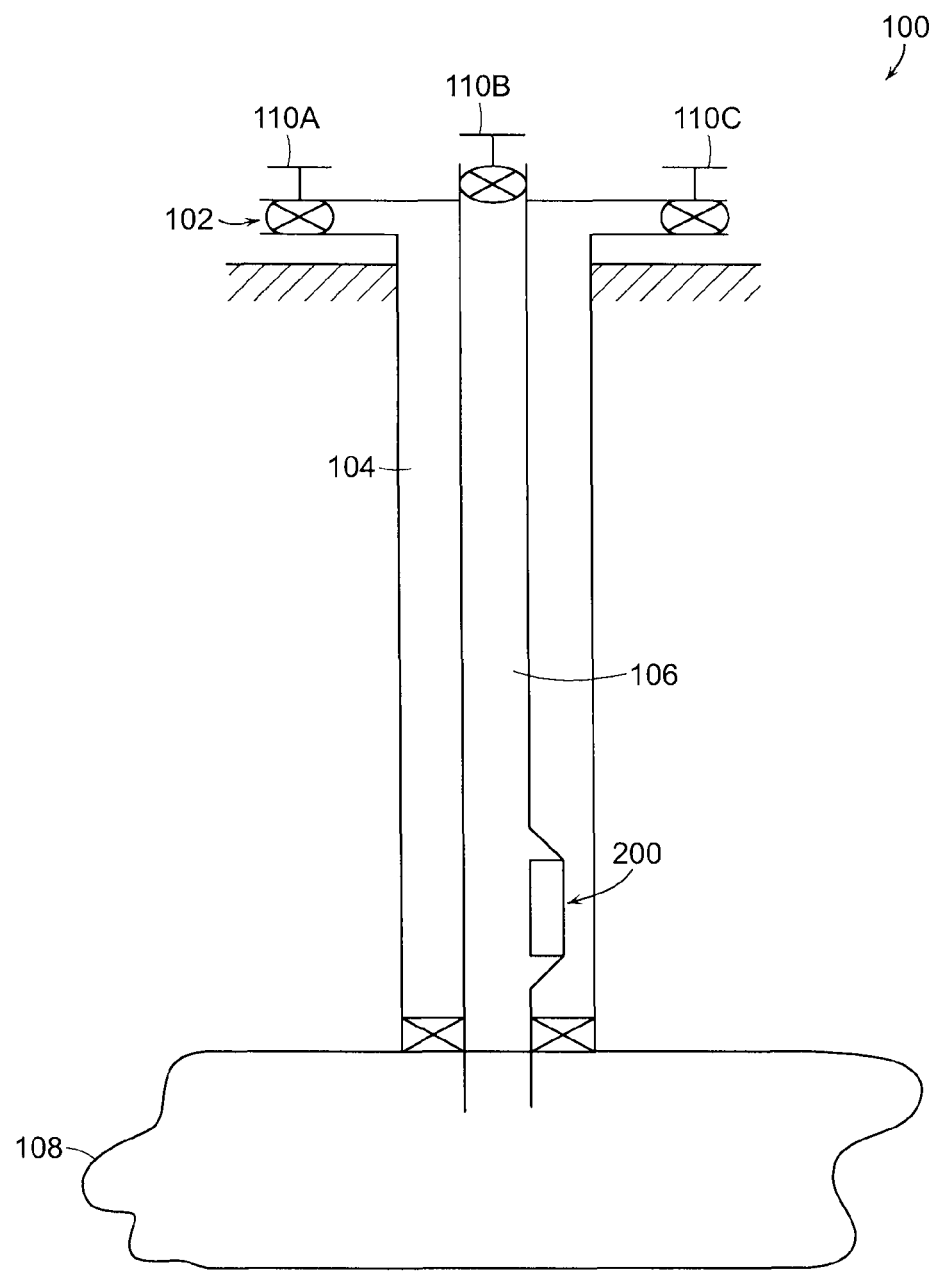
FIG. 1 is a schematic diagram of an example environment in which an embodiment of a thermally-actuated gas lift safety valve may be implemented.

Attention is directed to FIG. 1, which is an example environment in which embodiments of a thermal actuator according to the present disclosure can be employed. In this example application, the thermal actuator can be integrated into a thermally-actuated gas lift safety valve. In particular, FIG. 1 depicts a gas-lifted oil well 100 in which a thermally-actuated gas lift safety valve 200 is used. It should be understood by one having ordinary skill in the art, in the context of the present disclosure, that the gas-lifted oil well 100 shown in FIG. 1 is merely illustrative, and should not be construed as implying any limitations upon the scope of the disclosure. The gas-lifted oil well 100 comprises a piping infrastructure 102 located both partially above and beneath (e.g., extending 5 km beneath, though not limited to such applications) the sea floor (the latter indicated by diagonal lines in FIG. 1). The piping infrastructure 102 comprises an annulus 104 surrounding tubing 106, the tubing extending into a reservoir 108 of crude oil. Proximal to the sea floor surface are safety valves (e.g., flapper valves) 110A and 110C (restricting fluid flow through the annulus 104) and safety valve (e.g., flapper valve) 110B (restricting fluid flow through the tubing 106). Though described using flapper valves 110A, 110B, and 110C, other valves with similar functionality may be used as is known in the art. The thermally-actuated gas lift safety valve 200 enables gas to be injected from the annulus 104 to the tubing 106 to aerate the oil sourced from the reservoir 108, while preventing the ingress of the oil as it flows via aeration through the tubing 106 and to the annulus 104.

Figure 2:
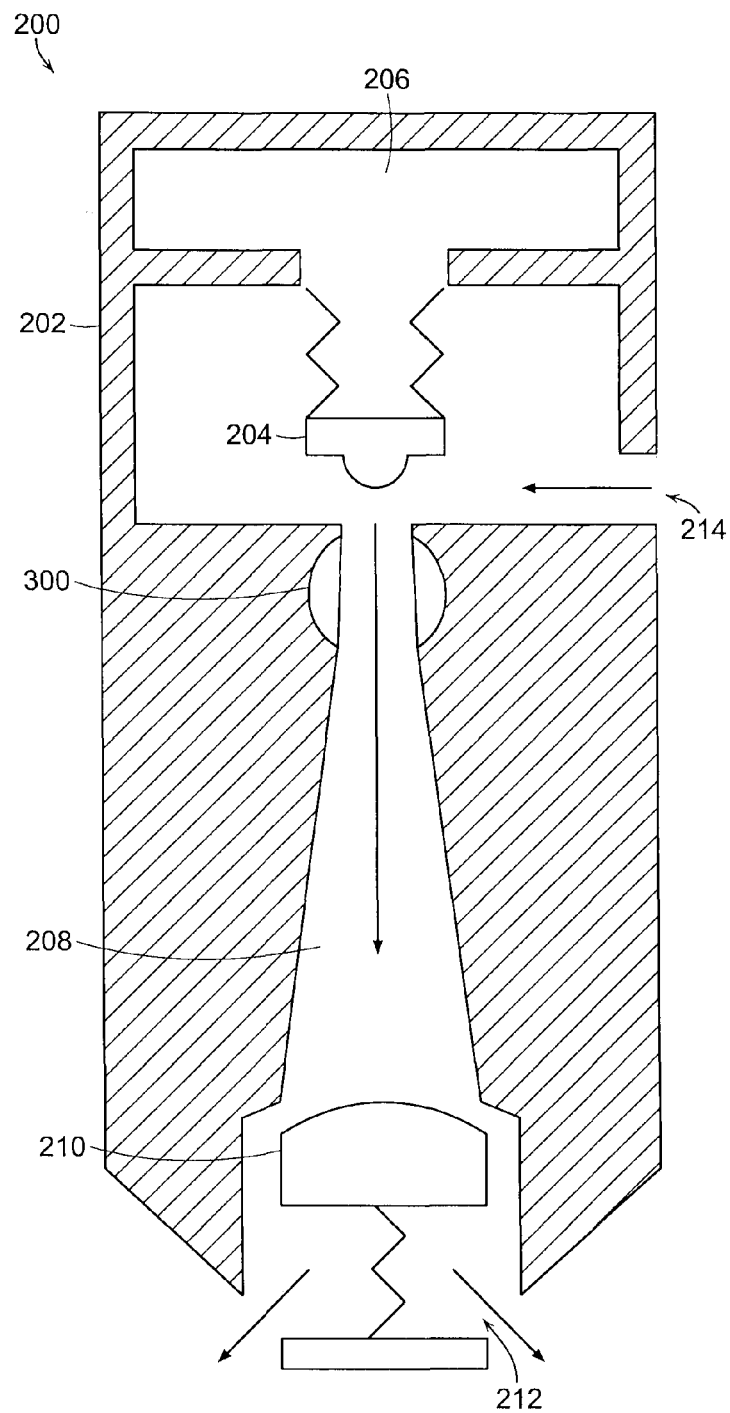
FIG. 2 is a schematic diagram that generally depicts an embodiment of a thermally-actuated gas lift safety valve.

Referring now to FIG. 2, a thermally-actuated gas lift safety valve 200 is shown in schematic, generalized (partially cut-away, upright position) form. The thermally-actuated gas lift safety valve 200 represents an example valve that could include a thermal actuator having a sharp phase change, as discussed further below. It should be understood by one having ordinary skill in the art, in the context of the present disclosure, that the thermally-actuated gas lift safety valve 200 shown in FIG. 2 is merely illustrative, and should not be construed as implying any limitations upon the scope of the disclosure.

The thermally-actuated gas lift safety valve 200 includes a valve body 202 suitably constructed with a material to withstand sub-sea surface pressure and/or temperatures (e.g., well temperatures may range from 20° C. to 70° C.). Enclosed within one end (proximal to the annulus 104, or as depicted in FIG. 2, the topmost position) of the valve body 202 is a bellows valve 204, depicted in FIG. 2 with a bellows chamber 206 for containing a suitable pressurized gas, such as nitrogen gas, among others. It should be understood that other configurations for a bellows valve 204 may be used in some embodiments, including those that use a spring with a charged bellows assist, among others well-known to those having ordinary skill in the art. Adjacent to (e.g., immediately beneath) the bellows valve 204 is a fluid flow restraining member assembly 300, which in one embodiment comprises a ball valve, stem, and extending member(s) as explained further below. The fluid flow restraining member assembly 300 resides adjacent the bellows valve 204 and proximal to a gas inlet end of an orifice 208, which in one embodiment is configured as a Venturi orifice. In some embodiments, the orifice 208 may be configured according to a different structure, such as a square-edged orifice. Proximal to the opposite end of the orifice 208 is a check valve 210, which allows fluid flow to be discharged from an outlet 212 of the thermally-actuated gas lift safety valve 200 while inhibiting flow in the reverse direction (e.g., toward the fluid flow restraining member assembly 300). In some embodiments, the check valve 210 may be implemented as an apparatus separate from the thermally-actuated gas lift safety valve 200, yet used in combination.

In an example aeration operation, as depicted in FIG. 2 by the use of arrows (with continued reference to FIG. 1), flow of gas to aerate the oil of the reservoir 108 proceeds from the annulus 104 to an inlet of the thermally-actuated gas lift safety valve 200. Upon the pressure of the gas from the annulus 104 overcoming the pressurized gas of the bellows valve 204, the bellows valve 204 opens and the gas flows through the opened ball valve of the fluid flow restraining member assembly 300, through the orifice 208, and past the check valve 210 and outlet 212 and into the tubing 106.

Figure 3:
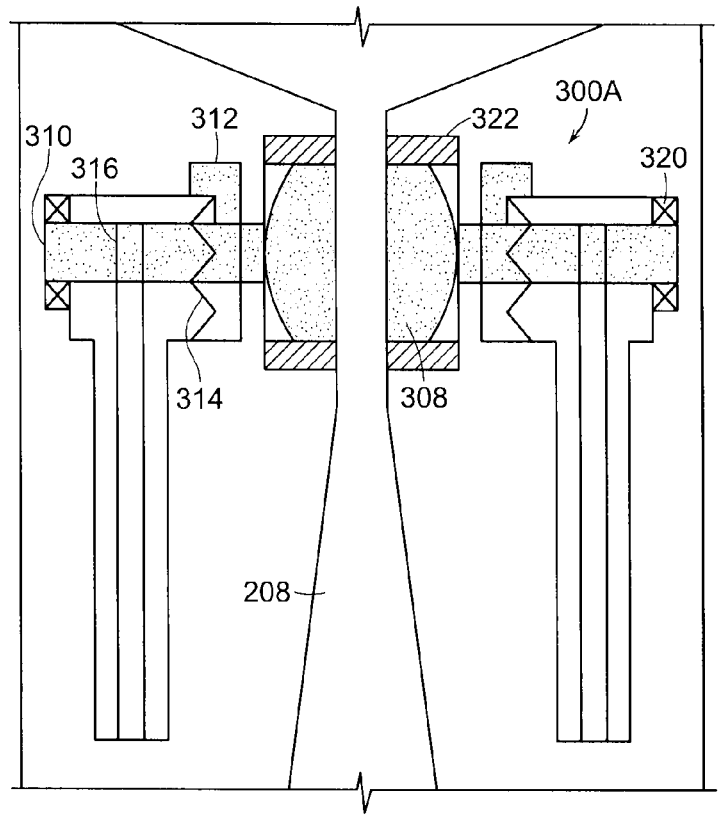
FIG. 3 is a schematic diagram that shows a partial cutaway, side elevation view of an embodiment of a thermally-actuated gas lift safety valve in which a shape memory alloy element can be incorporated.

Referring to FIG. 3, a partial cut-away (e.g., side elevation) schematic view of portions of a thermally-actuated gas lift safety valve 200A are shown. In particular, an example valve 200A of the fluid flow restraining member assembly 300 (depicted in FIG. 3 with reference numeral 300A) situated between the bottom of the bellows valve 204 and proximal to the one end of the orifice 208. The fluid flow restraining member assembly 300A includes the ball valve 308 and extending members 310 extending in one embodiment from opposing sides of the ball valve 308. Each extending member 310 is connected to a stopper 312 located proximally to the ball valve 308, the former which serves to constrain rotation of the fluid flow restraining member assembly 300A. A force assist member (e.g., spring) 314 is radially wound about at least a portion of each extending member 310. Shape memory alloy elements 316 are attached to each extending member 310 to enable rotation actuation. The respective extending members 310 further comprise lubricated joint bearings 320 at each end (end opposite the end adjacent to the stopper 312) for valve rotation. Sealing members 322 create a water-tight seal at the ball valve openings. Sealing members 322 may be embodied as elastomeric O-rings, or in some embodiments, other types of well-known water-tight sealing material such as packing, etc.

Additional details regarding such a gas-lift safety valve are disclosed in U.S. patent application Ser. No. 13/075,424 "Thermally-Actuated Gas-Lift Safety Valve", the entire disclosure of which is hereby incorporated by reference in its entirety. That application describes use of a commercially available shape memory alloy (SMA) as an actuator in such a valve. However, using the gas-lift safety valve as contemplated therein, there may be some circumstances where actuation may not occur properly. This is because typically such an SMA relies on a well-bore fluid temperature difference of at least 6° C. to completely actuate. Because some wells may have less than 6° C. temperature difference, the safety valve design described in that earlier application could not be applied.

Figure 4:
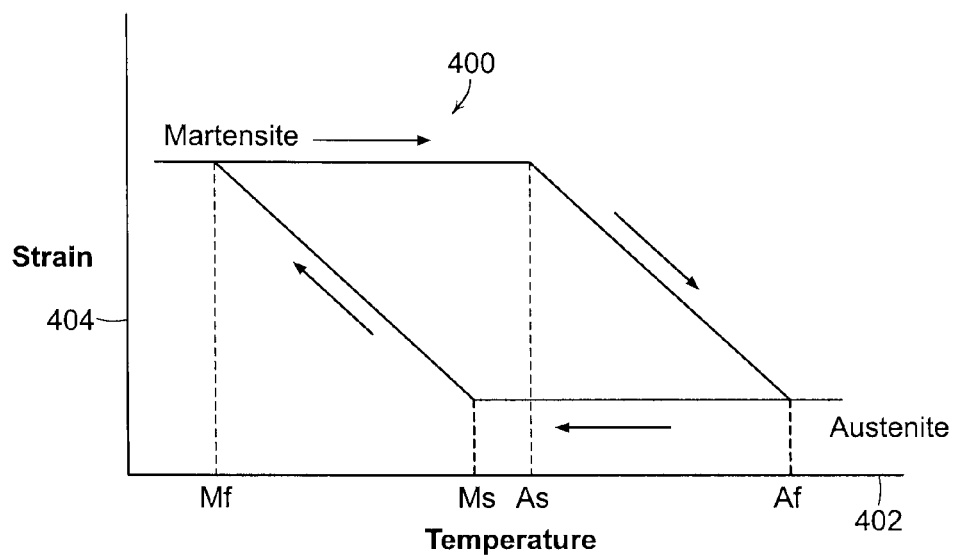
FIG. 4 is a hysteresis diagram that illustrates an example operation of the shape memory alloy element of an embodiment of a thermally-actuated gas lift safety valve.

A further understanding of an example operation of a thermal actuator, and in particular differences between the actuator of U.S. patent application Ser. No. 13/075,424 and that of the present disclosure, are discussed generally in accordance with a hysteresis diagram 400, as shown in FIG. 4. The diagram 400 includes a horizontal axis 402 corresponding to temperature, and a vertical axis 404 corresponding to strain. In general, shape memory alloys are alloys that undergo a solid state phase change between a Martensitic low-temperature state and an Austenitic high-temperature state when heated or cooled. These types of alloys are said to have "memory" because they return to the same low-temperature shape whenever cooled to the Martensitic state and to the same high-temperature shape when heated to the Austenitic state. As illustrated in FIG. 4, shape memory alloys do not have a single transition temperature between Martensite and Austenite, but instead undergo a hysteresis, with different transition temperatures depending on whether the alloy is being cooled or heated. Referring to FIG. 4, when the alloy is being heated, $A_s$ represents the start of the transition from Martensite to Austenite and $A_f$ represents the final transition to Austenite. When being cooled, $M_s$ represents the start of the transition from Austenite to Martensite and $M_f$ represents the final transition to Martensite. Based on the alloy proportion, a shape memory alloy may have transition temperatures within the range of −150° C. to +800° C. It should be understood in the context of the present disclosure that transition temperatures of the shape memory alloy elements 316 may be "tuned" to match any or substantially any given well conditions (e.g., manufacturers may alter the alloy composition to achieve different transition temperatures).

Figure 5A:
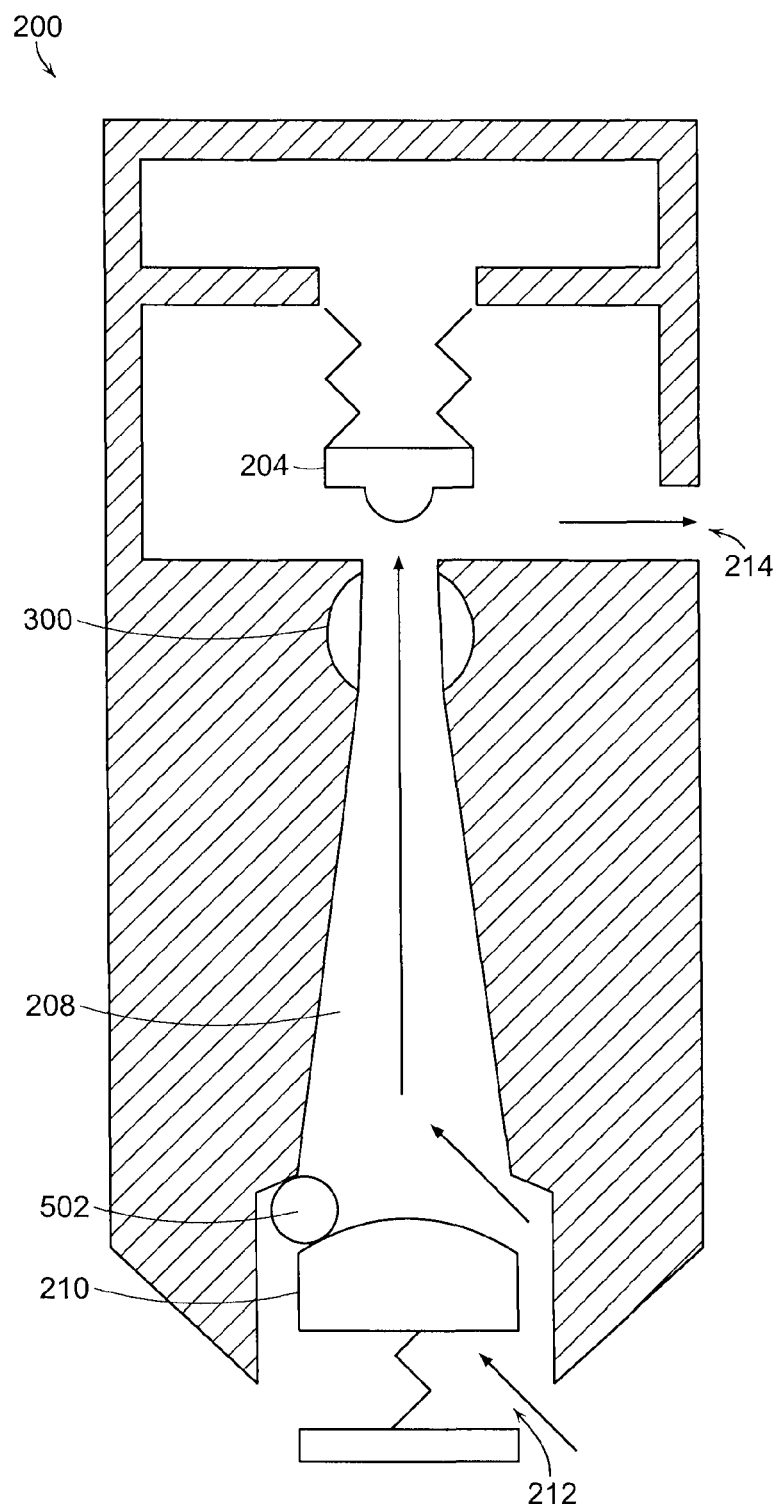
FIGS. 5A-5B are schematic diagrams that illustrate an example operation of an embodiment of a thermally-actuated gas lift safety valve when debris hinders proper operation of a check valve integrated into the thermally-actuated gas lift safety valve.
Figure 5B:
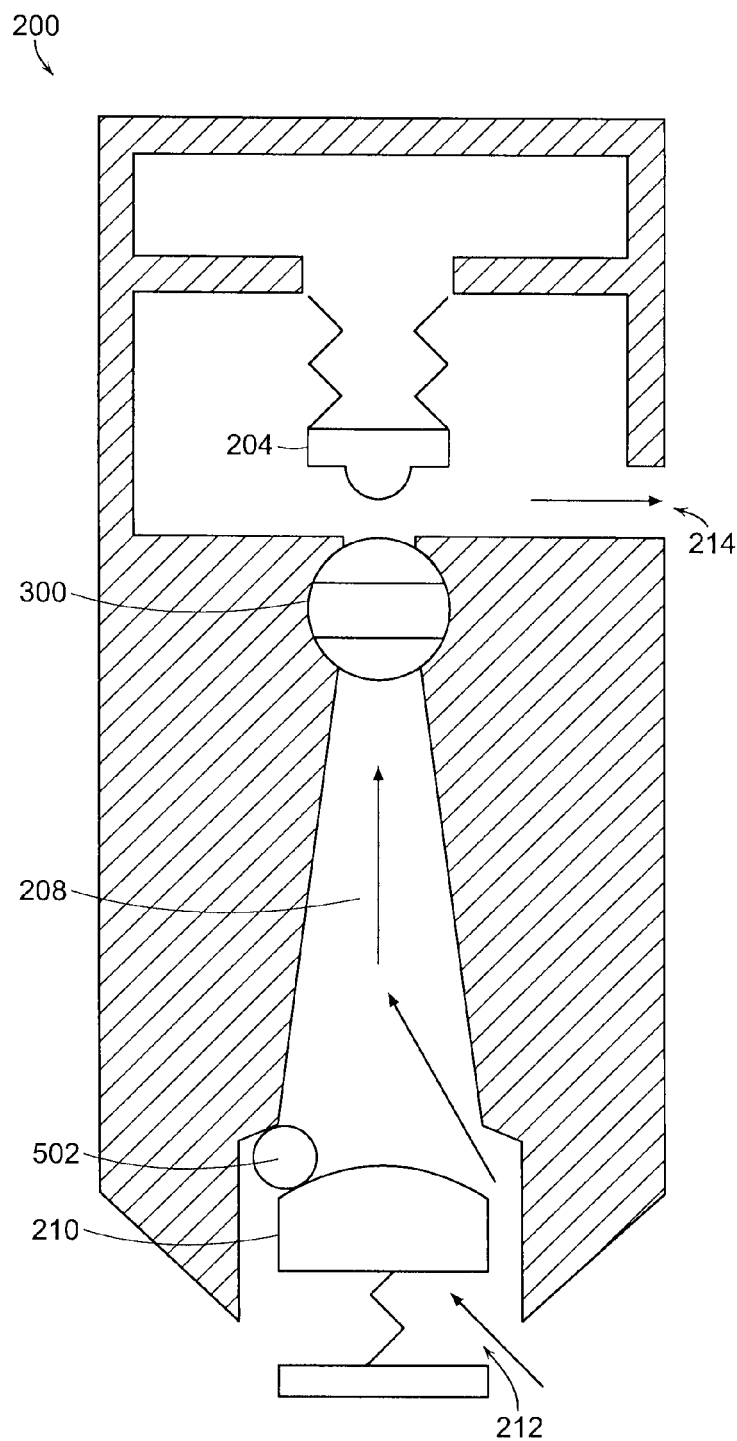

FIGS. 5A-5B are schematic diagrams that illustrate an example circumstance in which the thermally-actuated gas lift safety valve 200 of FIG. 2 may be actuated. In particular, FIGS. 5A-5B illustrate an example of operation of the thermally-actuated gas lift safety valve 200 when debris hinders proper operation of a check valve integrated into the thermally-actuated gas lift safety valve (i.e., failure mode operation of the valve).

It is noted that the thermally-actuated gas lift safety valve 200 shown in FIGS. 5A-5B is the same as, or similar to, the thermally-actuated gas lift safety valve 200 shown in FIG. 2, with the addition of debris 502 trapped between the check valve 210 and an interior surface of the orifice 208. In general, the thermally-actuated gas lift safety valve 200 relies on the temperature difference between the injected gas in the annulus 104 and the oil in the tubing 106. When the gas is injected through the thermally-actuated gas lift safety valve 200, the valve 200 is cooler than during a backflow situation. Thus, in a backflow situation, the thermally-actuated gas lift safety valve 200 heats up and closes. More particularly, a thermal actuator including a shape memory alloy element 316 is set to have a transition temperature $A_s$ above the injected gas temperature and an $A_f$ value below the oil temperature. The $M_s$ and $M_f$ transition temperature values are set to values between the oil temperature and the coldest temperature attainable in the valve-cooling scenario.

The failure conditions depicted in FIG. 5A represent the presence of debris 502 trapped in the check valve 210 (though other mechanisms of failure that halt proper movement of the check valve are contemplated), and the annulus pressure required to open the bellows valve 204 ($P_{open}$) being less than the actual pressure in the annulus 104 ($P_{ann}$), which is less than the pressure in the tubing 106 ($P_{tube}$). In other words, $P_{open} < P_{ann} < P_{tube}$. Under these conditions, oil flows improperly (as indicated by the single-headed arrows in FIGS. 5A-5B) through the outlet 212 into the orifice 208, through the opened ball valve 308 and opened bellows valve 204 and through the inlet 214 into the annulus 104. As the oil begins passing through the thermally-actuated gas lift safety valve 200, the entire thermally-actuated gas lift safety valve 200 heats up, in turn heating up the shape memory alloy elements 316 (e.g., by conduction of the heat through the body or housing of the thermally-actuated gas lift safety valve 200) to the oil reservoir temperature. Further, the absence of the cooler injection gas together with the heat conduction affects the shape memory alloy elements 316. In other words, the shape memory alloy elements 316 contract as they heat up past $A_s$ and $A_f$, and thus pull the ball valve 308 (through actuation upon the extending members 310) into a closed (e.g., horizontal) position, as indicated in FIG. 5B.

If the shape memory alloy elements 316 cool and transition to the Martensite state, the shape memory alloy elements 316 expand and the force assist members 314 pull the ball valve 308 back into the open position. In other words, the force assist members 314 assist in restoring the ball valve 308 to the open position.

In applications in which the thermal actuation is required based on a relatively small change in temperature, it is advisable to have the Austenitic transition start temperature, $A_s$, be as close to the Austenitic transition final transition temperature, $A_f$. Although, as discussed in U.S. patent application Ser. No. 13/075,424, typical transition temperature differentials generally require a substantial change in temperature, it is recognized that the change in these temperatures is also dependent upon stress applied to the shape memory alloy. This can be expressed by the following equations, representing differences in $A_s$ and $A_f$ in response to strain:

$$A_{s\sigma} = A_s + \sigma/C$$

$$A_{f\sigma} = A_f + \sigma/C$$

where $A_{s\sigma}$ is the Austenite start transition temperature under external stress $\sigma$, $A_s$ is the Austenite start transition temperature under no external stress, $A_{f\sigma}$ is the Austenite finish transition temperature under external stress $\sigma$, $A_f$ is the Austenite finish transition temperature under no external stress, and C is a constant dependent on the material.

As such, if a greater strain were introduced at the point where a shape memory alloy were at the Austenitic transition start temperature, $A_s$, as compared to the Austenitic transition final transition temperature, $A_f$, the two temperatures could be closer. In accordance with the various configurations described below in FIGS. 6-9, application of a negative-differential spring to the shape memory alloy introduces greater strain at the lower $A_s$ temperature than at the higher $A_f$ temperature. As such, it is possible to arrange a thermal actuator that has a sharp response (i.e., an actuation response below the previously available 6° C. temperature variation). In particular, a variety of types of negative-differential spring arrangements can be used, such as a mass on a lever rotating from horizontal to vertical, a coiled metal ribbon of decreasing width, or a wire rotating a cam of decreasing radius.

In some embodiments, the negative-differential spring can be implemented as an opposing shape memory alloy element. In this differential SMA configuration, two SMA wires are attached antagonistically and each heated independently. One wire acts as the actuator, while the other used as the restoring wire. As the actuating wire is heated and contracts, the restoring wire is pulled in tension and undergoes stress-induced Martensitic transformation. The restoring wire has a high initial stiffness, and then a lower stiffness after Martensitic transformation. Thus the restoring wire acts as a negative-differential spring and decreases the amount of temperature change necessary to transform the actuating wire. To reverse this process, the restoring wire is heated and acts as an actuator in the reverse direction while the other wire acts as the restoring wire.

The main use of differential SMA actuators is to shorten cycling time of the actuation system. This setup, however, is not generally suited to an application where only conductive heating is available, such as the gas-lift safety valve application discussed above in connection with FIGS. 1-3 and 5A-5B.

Figure 6:
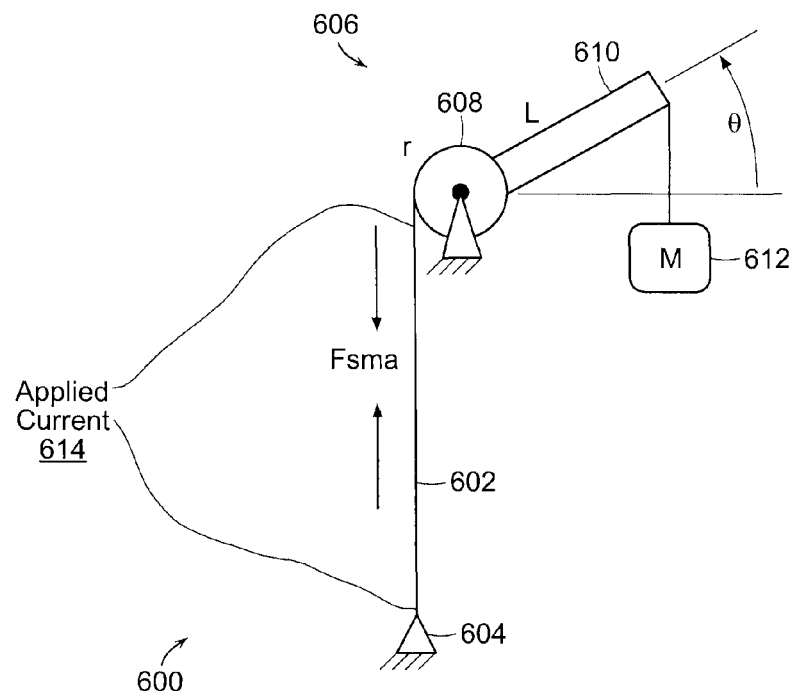
FIG. 6 is a schematic diagram illustrating a test arrangement used to form a thermal actuator including a shape memory alloy and having a sharp phase change, according to an example embodiment.

Referring now to FIGS. 6-9, a first test arrangement and associated test of a thermal actuator including a shape memory alloy and having a sharp phase change is discussed. FIG. 6 illustrates a first test arrangement 600 used to form a thermal actuator including a shape memory alloy and having a sharp phase change, according to an example embodiment. Test arrangement 600 generally represents an electrical heating arrangement of a shape memory alloy useable to illustrate the negative-differential spring concept described above.

In the embodiment shown, the test arrangement 600 includes a shape memory alloy 602 interconnected between a ground 604 and a rotatable lever 606. The rotating lever 606 includes a generally circular portion 608 and an arm 610. A mass 612 is pivotally attached to an end of the arm 610, such that in the embodiment shown the mass 612 hangs downwardly from the arm 610. A current source 614 applies current across the shape memory alloy 602 to heat the alloy, including through a temperature change between $A_s$ and $A_f$.

Assuming the circular portion 608 has a radius r and the mass 612 is represented as M connected at a distance L from the pivot point (i.e., the length of the arm 610 extending from the pivot point), the stress force applied to the shape memory alloy, $\sigma_{SMA}$, is found by dividing the total force applied by the cross sectional area of the wire:

$$\sigma_{SMA} = \frac{MgL}{A_r} \cos\theta$$

where $\theta$ represents the angle of the arm 610 from horizontal, and g is the gravitational constant. To form a negative-differential spring (i.e., having a stress characteristic in which stress decreases as displacement increases), the lever 606 is initially started at a positive angle q between zero and 90 degrees from horizontal. As the SMA wire 602 is heated it contracts, rotating the lever 606 up to a final angle also between zero and 90 degrees. The cosine of the angle decreases as the angle increases, and thus the external stress applied to the wire decreases as the wire heats up.

To validate the effects of a negative-differential spring, the test arrangement can likewise be configured to represent a positive spring, in which applied stress increases as displacement increases. In this example, the lever 610 is initially started at a negative angle between negative 90 degrees and zero degrees. As the SMA wire 602 is heated and contracts it rotates the lever 610 up to a final angle also between −90 degrees and zero degrees. The cosine of the angle increases in this scenario, meaning the external stress in the wire increases as the wire is heated.

In the first test arrangement 600, the lever 610 is started at an initial angle of 40 degrees to achieve a negative-differential spring, and current is applied to the wire 602 until it completely transitions from Austenite to Martensite. A 0.5-kg mass is used, with a 0.1-m lever and 0.51-m initial SMA wire length. Current is increased approximately linearly over a 20-minute time interval, as illustrated further in FIG. 7. A Crossbow CXTA01 inclinometer is used to measure the rotation of the lever 610, and a BK Precision 1672 DC Power Supply used to provide electrical current to the wire 602.

Figure 7:
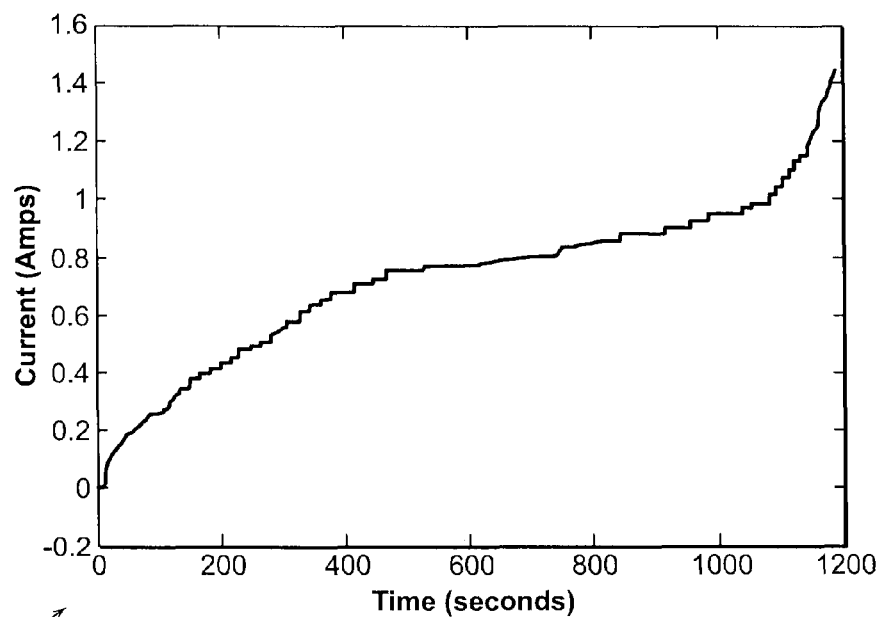
FIG. 7 is a chart representing current passing through a shape memory alloy over time during a tested temperature change in the test arrangement of FIG. 6.

FIG. 7 illustrates a chart 700 representing a plot of current against time for a test of the arrangement 600, in both the positive spring and negative-differential spring configurations. As seen in the chart 700, current is initially zero, and is gradually increased over time to approximately 1.5 amperes.

Figure 8:
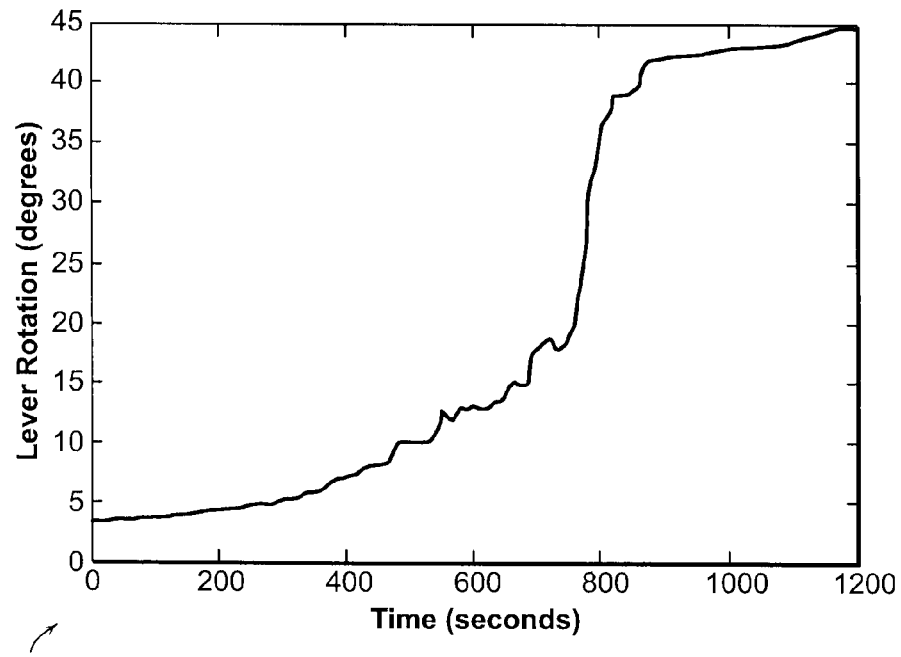
FIG. 8 is a chart illustrating rotation of a lever used as a negative-differential spring in the test arrangement of FIG. 6, concurrent with the current applied as illustrated in FIG. 7.

FIG. 8 illustrates a chart 800 representing a plot of lever rotation against time for the test arrangement 600, and in response to application of the current illustrated in the chart 700 of FIG. 7. As can be seen in the chart 800, at approximately the 800 seconds mark of the plot, a sharp transition occurs in the amount of lever rotation, between about 20 and about 45 degrees.

Figure 9:
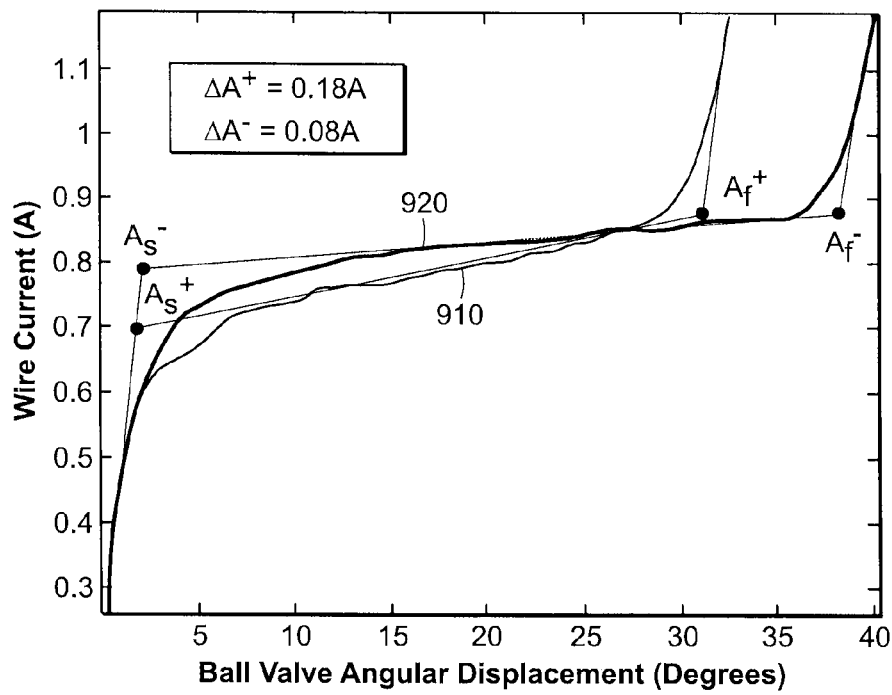
FIG. 9 is a chart illustrating angular displacement of a ball valve actuated by a shape memory alloy in the test arrangement illustrated in FIG. 6, illustrating a difference in response when using a positive spring and a negative-differential spring when applying a current as illustrated in FIG. 7.

FIG. 9 illustrates a chart 900 that compares experimental results of rotation of a lever 610 under positive spring and negative-differential spring configurations. Specifically, chart 900 represents an averaged, filtered set of experimental results over five experiments using the current application in chart 700 on the test arrangement 600. As seen in FIG. 9, a positive spring plot 910 indicates that, for the positive spring the $A_s^+$-$A_f^+$ difference is 0.18 Amperes. Comparatively, a negative spring plot 920 illustrates that for the negative-differential spring the $A_s^-$-$A_f^-$ difference is 0.08 Amperes. If current is assumed to be roughly proportional to temperature in the wire 602 above an ambient temperature, then this 0.1-Ampere difference would correspond to an approximately 5° C. decrease in $A_s$-$A_f$ spread, using the masses and lever arm values stated above. Thus, the thermally actuated safety valve is potentially applicable to wells with gas-oil temperatures less than 6° C., even with relatively small changes to the force applied. Additionally, the SMA wire 602 contracts more in the negative-differential spring scenario. It is suspected that this is because, at the end of the heating cycle the wire contraction must overcome a smaller restoring force with a negative differential spring than with a positive spring. This finding could allow less SMA wire length to be used in a thermal actuator, such as in the gas lift safety valve applications described above.

It is noted that, although the experimental results in FIGS. 6-9 are provided based on observation using a lever-arm type negative-differential spring, other types of negative-differential spring could be used to similar effect. Accordingly, the particular negative-differential spring that would be used is at least somewhat dependent upon application. For example, opposed shape memory alloys may be useable in a circumstance where current-based actuation is available, but might not be used where only conductive heating is available, such as in the gas-lifted well arrangements discussed herein. Other arrangements discussed herein, such as a mass on a lever rotating from horizontal to vertical, a coiled metal ribbon of decreasing width, and a wire rotating a cam of decreasing radius, may also have other circumstances where they may or may not be the optimal negative-differential spring. However, the various embodiments discussed herein, when components are selected to match the temperatures experienced by the shape memory alloy and the characteristics of the shape memory alloy, will allow the safety valve to actuate with less than a 6° C. temperature difference. More broadly, this invention would allow any device actuated by SMAs to become much more precise, i.e. translating a small temperature change into a large displacement.

Referring to FIGS. 1-9 generally, it is noted that in most cases a temperature change, such as may affect a shape memory alloy, may be sufficient to detect the presence of a reverse flow condition requiring a valve assembly to be closed. However, in some cases a backflow condition may occur when a temperature change is small, or where environmental temperatures may vary to the extent that the shape memory alloy falsely actuates the valve. Accordingly, and referring now to FIGS. 10-13, a possible arrangement 1000 is shown in which a sensor and a power supply are provided in association with a shape memory alloy element in a valve actuator. As further discussed below, the shape memory alloy element can be selected and arranged, alongside additional sensor and circuit features, to address such false actuations or non-actuations. By incorporating a sensor and associated circuit, the shape memory alloy element described above can be circuit actuated, for example based on the existence of backflow oil detected based on conductivity of fluid within the valve.

Figure 10:
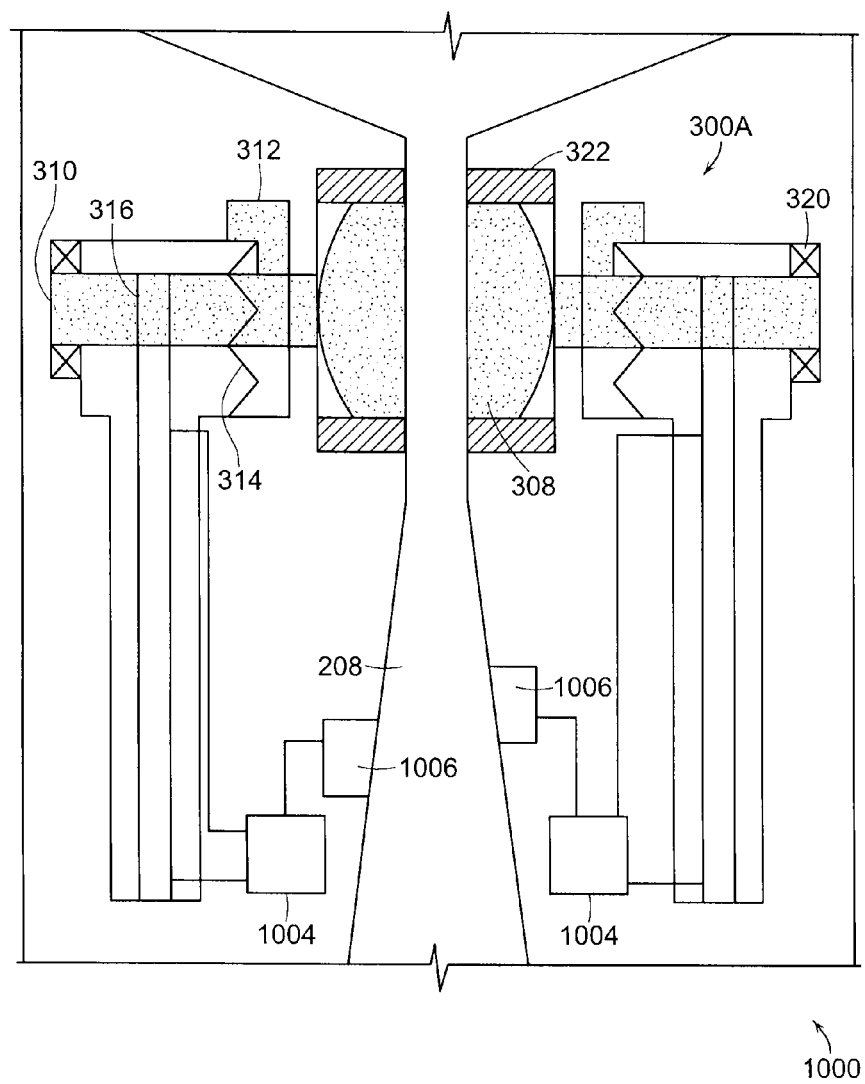
FIG. 10 is a schematic diagram that illustrates an example operation of an embodiment of a thermally-actuated gas lift safety valve having a sensor integrated into the thermally-actuated gas lift safety valve.

In the embodiment shown, the arrangement 1000 generally corresponds to a the thermally-actuated gas lift safety valve 200A illustrated above in connection with FIG. 3, but including additional features assisting actuation of the valve. In particular, in this arrangement 1000, a shape memory alloy 316 is electrically connected to a power supply 1004. The power supply 1004 can be located proximate the orifice 208, as shown in FIG. 10, or in alternative embodiments, can be located above ground. Additionally, as illustrated in FIG. 10, two or more separate power supplies could be used, such that each shape memory alloy used can have associated therewith one or more power supplies.

In the embodiment shown, one or more sensors 1006 are located with within the orifice 208. Each sensor 1006 is arranged to detect one or more properties of fluids that flow through the orifice 208. For example, the sensor 1006 can be placed in contact with fluids that flow through the orifice 208 to allow the sensor 1006 to measure a property of the fluid. For example, the sensor 1006 may be a conductivity sensor and may measure the conductivity of fluids flowing through the orifice 208.

During operation, a gas may flow through the orifice 208 as described above with respect to FIG. 2. During a failure, as described above with respect to FIGS. 5A and 5B, oil may backflow through the orifice 208. Since, in general crude oil has a conductivity of approximately five times the conductivity of sea water, the sensor 1006 may detect the presence of the oil (and therefore existence of a backflow condition) by measuring the conductivity of the oil (or gas, or water) within the valve orifice 208. Though described using a conductivity sensor, other sensors may be used as is know in the art. For example, the sensor 1006 may be a flow rate sensor, a flow direction sensor, a pressure sensor, or a temperature sensor as known in the art.

In the embodiment shown, the sensor 1006 is electrically connected to the power supply 1004. When the sensor 1006 detects the presence of the oil, the power supply 1004 passes a current through the shape memory alloy element 316. The current passing through the shape memory alloy element 316 will cause its temperature to increase quickly, thereby causing the temperature of the shape memory alloy element 316 to quickly surpass its Austenitic start temperature. As described above, this actuation of the shape memory alloy element 316 due to its electricity-induced increase in temperature will close the ball valve 308.

Figure 11:
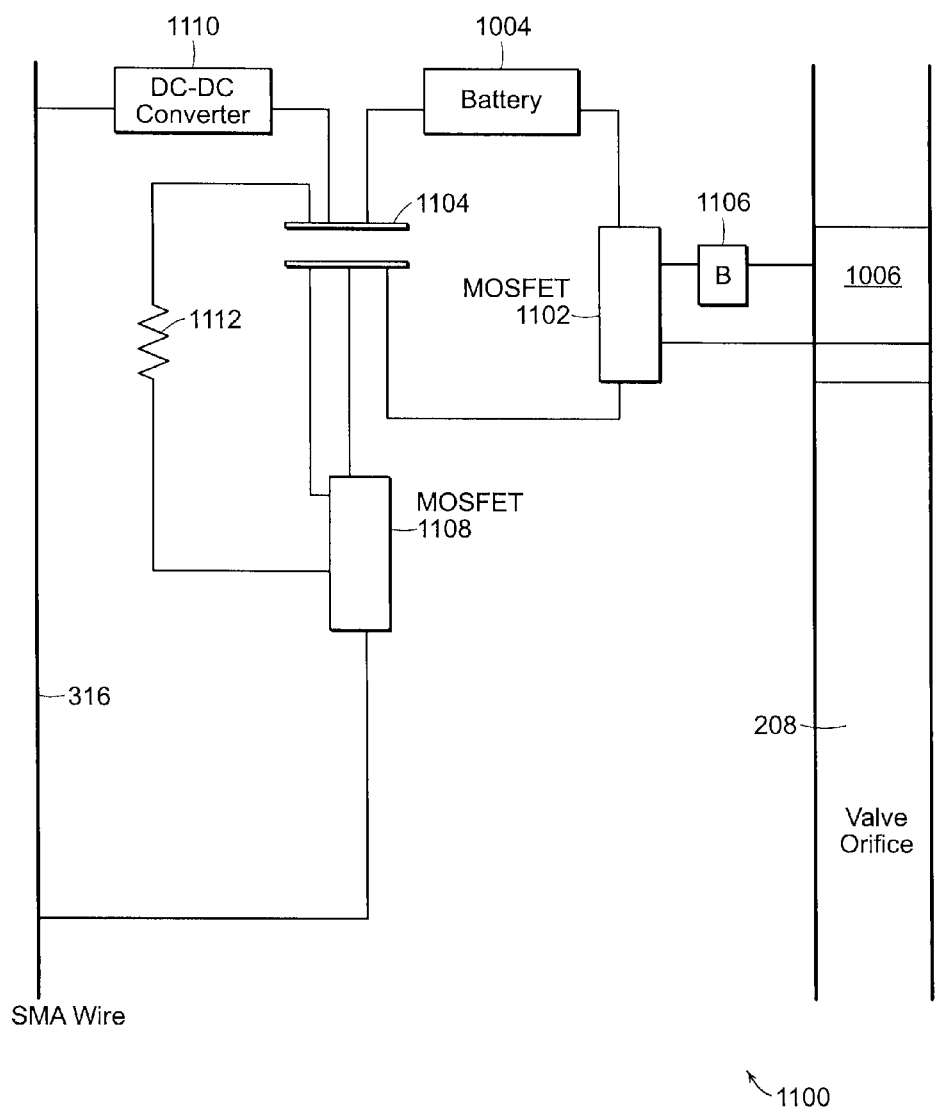
FIG. 11 is a schematic diagram of an example circuit useable within the thermally-actuated gas lift safety valve of FIG. 10.
Figure 12:
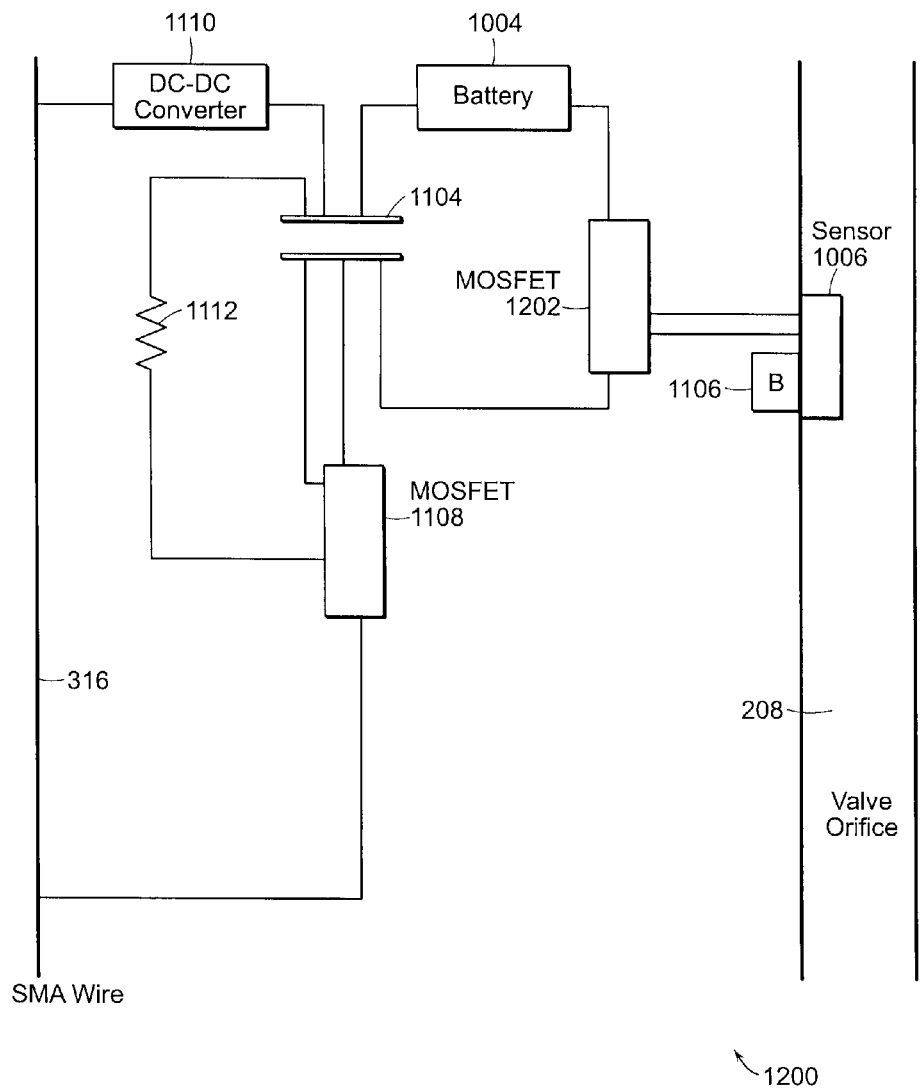
FIG. 12 is a schematic diagram of a second example circuit useable within the thermally-actuated gas lift safety valve of FIG. 10.

Referring now to FIGS. 11-12, two example circuits are illustrated which can be used to accomplish the arrangement of FIG. 10. In FIG. 11, a circuit 1100 is connected between a shape memory alloy element 316 and a sensor 1006, shown as one or more electrodes placed across valve orifice 208. In the embodiment shown, a battery 1004 is electrically connected between a MOSFET switch 1102 and a capacitor 1104. The MOSFET switch 1102 is interfaced to the electrodes, and is activated in the event oil is detected in the valve orifice 208, e.g., via current across electrodes generated by a button battery 1106.

In the embodiment shown, capacitor 1104 stores large charge from the battery 1004. Upon the capacitor 1104 becoming charged at least above a predetermined threshold, a second MOSFET switch 1108 is activated, thereby activating a DC-DC converter 1110 to delivery current across the shape memory alloy element 316 by enabling a voltage difference to appear across the shape memory alloy element. The shape memory alloy element 316 is thereby heated by the current to a point above an actuation temperature, corresponding to the Austenite start temperature of the shape memory alloy element 316. In connection with the capacitor 1104, a resistor 1112 connects to a gate of the MOSFET switch 1108, which is also connected to a negative voltage side of the capacitor 1104. In this way, the MOSFET switch 1108 can switch based on the voltage difference.

Referring to FIG. 12, a second circuit 1200 is shown connected between a shape memory alloy element 316 and a sensor 1006. In this embodiment, the MOSFET switch 1102 is replaced by MOSFET 1202, which is electrically connected directly to the sensor 1006. As such, the MOSFET 1202 does not directly connect to button battery 1106 in this embodiment; otherwise, the principle of operation, and components included in circuit 1200, is analogous to that disclosed in FIG. 11.

Figure 13:
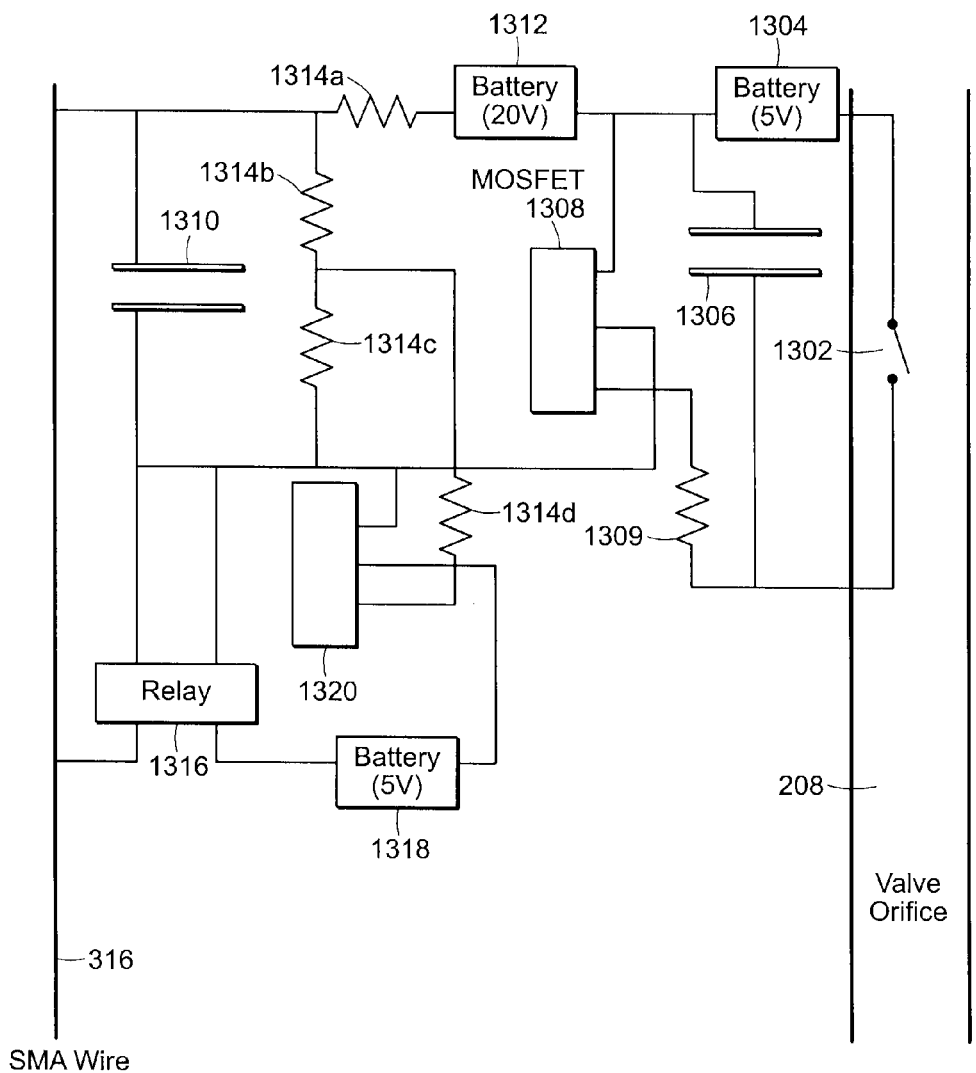
FIG. 13 is a schematic diagram of a third example circuit useable within the thermally-actuated gas lift safety valve of FIG. 10.

FIG. 13 illustrates a further possible embodiment of a circuit 1300 useable to actuate a shape memory alloy element 318 in response to sensing oil in a valve orifice 208. In the embodiment shown, the circuit 1300 includes a conductivity sensor 1302, which can, in various embodiments, be used as the sensor 1006. The conductivity sensor 1302 is electrically connected to a battery 1304, shown as a 5V battery, capable of delivering an electrical signal across the orifice 208 at the conductivity sensor 1302. A capacitor 1306 is connected in parallel with the conductivity sensor 1302, and across a MOSFET switch 1308. In the embodiment shown, a resistor 1309 is electrically connected between the drain of the MOSFET switch 1308 and the conductivity sensor 1302 as a current limiting mechanism.

The MOSFET switch 1308 activates based on detection of oil by the conductivity sensor 1302, thereby forming a circuit across a second capacitor 1310, and including a second battery 1312, shown as a 20V battery. Capacitor 1310 works in conjunction with the battery 1312 to deliver current across the shape memory alloy element 316. In some embodiments, the capacitor 1310 can be a supercapacitor, having high capacity and capable of smoothing the load current delivery from the battery, thereby increasing the life of battery 1312. The battery 1312 performs the general function of battery 1004 of FIG. 10, above, and can be, for example, an alkaline battery having a low current output, and capable of reliable operation in a range of about −20 to about 50 degrees Celsius.

In connection with battery 1312 and capacitor 1310, a resistor network provides current and voltage control within the circuit 1300, and includes various resistors 1314a-d. A relay 1316 selectively actuates a circuit across the shape memory alloy element 316, thereby causing current to pass through the element from battery 1312 and capacitor 1310. The relay 1316 also electrically connects to a battery 1318 and second MOSFET switch 1320 which selectively connects the battery 1318 to the circuit 1300.

Referring to FIGS. 11-13 generally, it is noted that although the circuits disclosed represent only some of a variety of possible circuits useable to induce current on a shape memory alloy element 318 to cause actuation of a valve. In the embodiments disclosed herein, the shape memory alloy element corresponds to an approximately five inch shape memory wire having a resistance of 2.2 ohms, and capable of contraction under a current of approximately 4 amps within ten seconds. However, other shape memory alloy elements could be used as well, with varying circuits designed to accommodate actuation of such elements.

Additionally, although the circuits disclosed herein indicate generally continuous monitoring within a valve for backflow conditions, it is noted that in many embodiments, the sensors 1006, 1302 of the circuits disclosed herein can be activated periodically to save power. For example, in some embodiments, the sensors are activated once per hour, or once per day, to prevent rapid power consumption from the various batteries used in the valve arrangements.

Figure 14:
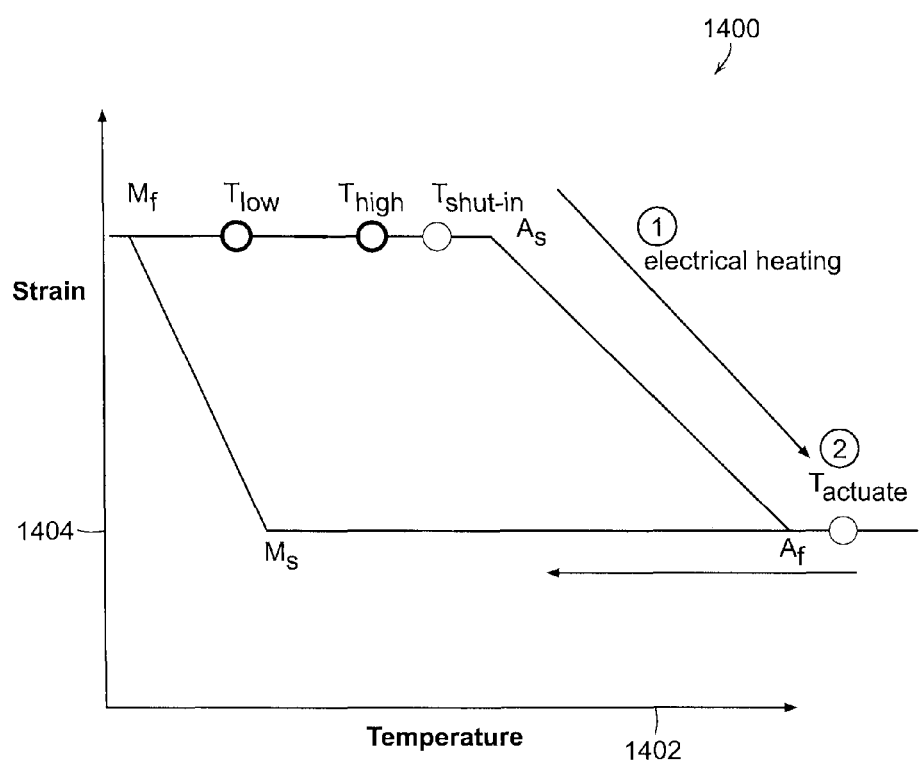
FIG. 14 is a chart representing a change in temperature of the well and the shape memory allow element over time of the test arrangement of FIG. 10.

Referring now to FIG. 14, a diagram 1400 representing a change in temperature of the well and the shape memory alloy element over time. The diagram 1400 includes a horizontal axis 1402 corresponding to temperature, and a vertical axis 1404 corresponding to strain, and illustrates guidelines for selecting a shape memory alloy element for use in connection with the circuit-based designs of FIGS. 10-13.

As illustrated in the diagram 1400, during normal operations the temperatures with the well may fluctuate with time. For example, the well temperature may fluctuate between a low temperature, $T_{low}$, and a shut temperature, $T_{shut-in}$, with normal operations occurring between $T_{low}$ and $T_{high}$. In accordance with the sensor-based embodiments disclosed in FIGS. 10-13, the shape memory alloy element 318 of the present disclosure is preferably selected such that both the low temperature and the shut temperature are below the Austenitic start and Austenitic final temperatures, thereby preventing temperature changes occurring at the valve from actuating the valve. Rather, when the sensor 1006 detects the failure condition (i.e., oil backflowing through the orifice 208), a power supply (e.g., power supply 1004, 1312) is electrically connected across the shape memory alloy element passes a current through the shape memory alloy element 316. The current causes the shape memory alloy element 316 to heat to a temperature higher than would otherwise be expected to occur within the valve, and above the Austenitic start and Austenitic final temperatures (e.g., $T_{actuate}$). Thus, the heating will cause the ball valve 308 to close and stop the backflow of oil.

Using the sensor 1006 to detect the failure condition and the power supply 1004 to cause the temperature change the shape memory alloy element 316 generally can be accomplished in a way to avoid falsely closing ball valve 308. For example, during operation the well may undergo a temperature change greater than 6° C., which may not be due to a failure, but due to natural fluctuations in temperature during normal operations. By using the sensor 1006 and the power supply 1004 a shape memory alloy element 316 may be selected that has a higher Austenitic start temperature and Austenitic final temperature than might be expected in the well. For instance, normal well temperatures may range from 40° C. to 50° C. During normal operations the temperature may fluctuate between 40° C. and 50° C. To avoid the shape memory alloy element 316 closing the ball valve 308 shape memory alloy element with a Austenitic start temperate and Austenitic final temperature above 60° C. may be selected. During a failure situation, the sensor 1006 will detect the backflowing oil and the power supply 1004 will pass a current through the shape memory alloy element 316. The current will cause the shape memory alloy element 316 to heat past the Austenitic start temperature and the Austenitic final temperature, thereby closing the ball valve 308. It should be understood by one having ordinary skill in the art, in the context of the present disclosure, that the thermally-actuated gas lift safety valve shown in FIG. 10 is merely illustrative, and should not be construed as implying any limitations upon the scope of the disclosure.

It is noted that, although the valve actuation arrangements of FIGS. 10-14 are provided based on observation using particular sensors and circuits in connection with a shape memory alloy element, other types of sensors and circuits could be used to similar effect. Furthermore, the circuits of FIGS. 10-13 can be used in connection with the above arrangements relating to applying a biasing spring, to both provide sharp phase change of a shape memory alloy and also allowing for sensor-based detection of backflow conditions. In still further embodiments, the valve actuation arrangements of FIGS. 10-14 can be implemented in the absence of the biasing elements resulting in sharp phase change of the shape memory alloy actuation element; rather, since the sensors and circuits can detect changes in conditions, those sensors and circuits can directly apply a voltage to the shape memory alloy that would quickly cause actuation of the shape memory alloy wire 316 regardless of whether such a biasing element were applied.

The foregoing description of illustrated embodiments of the present disclosure, including what is described in the abstract, is not intended to be exhaustive or to limit the disclosure to the precise forms disclosed herein. While specific embodiments of, and examples for, the disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments.

Thus, while the present disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope of the disclosure. Therefore, many modifications may be made to adapt a particular situation or material to the essential scope of the present disclosure. It is intended that the disclosure not be limited to the particular terms used in following claims and/or to the particular embodiment disclosed as the best mode contemplated for carrying out this disclosure, but that the disclosure will include any and all embodiments and equivalents falling within the scope of the appended claims.

The invention claimed is:

1. A valve actuator comprising:
   a shape memory alloy element attachable to a valve body, capable of use with a valve to cause movement of the valve between first and second positions responsive to at least a threshold amount of temperature change of the shape memory alloy element;
   a sensor located within a well, the sensor capable of detecting the presence of a fluid based on a fluid property of the fluid; and
   a power supply electrically connected to the sensor and the shape memory alloy element, the power supply capable of applying an electric current to the shape memory alloy element in response to the sensor detecting the presence of the fluid, the electric current causing a temperature of the shape memory alloy element to increase beyond a threshold temperature at which the shape memory alloy element actuates, thereby causing movement of the valve between the first and second positions, when the shape memory alloy element cools to below the threshold temperature, the shape memory alloy element causes the valve to be in an open position using a negative differential spring.

2. The valve actuator of claim 1, wherein the shape memory alloy element contracts from a first length to a second length when heated from a first temperature to a second temperature by the electric current, wherein the first temperature is below the threshold temperature and the second temperature is above the threshold temperature.

3. The valve actuator of claim 2, wherein the first temperature is below an Austenitic start temperature, and wherein the second temperature is above an Austenitic finish temperature.

4. The valve actuator of claim 2, wherein the shape memory alloy element extends from the second length to the first length when cooled from a third temperature to a fourth temperature.

5. The valve actuator of claim 4, wherein the third temperature is a Martensitic start temperature and the fourth temperature is a Martensitic finish temperature.

6. The valve actuator of claim 1, wherein the first and second positions correspond to open and closed valve positions.

7. The valve actuator of claim 1, further comprising a circuit electrically connected between the sensor and the power supply, the circuit configured to electrically connect the power supply across the shape memory alloy element based on detection of the fluid by the sensor.

8. The valve actuator of claim 7, wherein the circuit includes a supercapacitor electrically connected in parallel with the shape memory alloy element.

9. The valve actuator of claim 1, wherein the sensor comprises a conductivity sensor including one or more electrodes.

10. The valve actuator of claim 1, wherein the sensor is selected from a group of sensors consisting of:
    a flowrate sensor;
    a flow direction sensor;
    a conductivity sensor;
    a pressure sensor; and
    a temperature sensor.

11. The valve actuator of claim 1, wherein the shape memory alloy element is selected to have a threshold temperature above an expected environmental temperature range of the valve actuator.

12. The valve actuator of claim 1, wherein the sensor is located within a valve orifice of the valve body associated with the valve actuator.

13. A valve, comprising:
    a valve body located within a well;
    an orifice disposed within the valve body;
    a fluid flow restraining member located at a first location of the orifice, the fluid flow restraining member movable between a closed position and an open position;
    a shape memory alloy element connected to the fluid flow restraining member, the shape memory alloy element causing movement of the fluid flow restraining member between open and closed positions responsive to at least a threshold amount of temperature change of the shape memory alloy element;

a sensor located within the orifice, the sensor capable of detecting the presence of a fluid based on a fluid property of the fluid; and a power supply electrically connected to the sensor and the shape memory alloy element, the power supply capable of applying an electric current to the shape memory alloy element in response to the sensor detecting the presence of the fluid, the electric current causing a temperature of the shape memory alloy element to increase beyond a threshold temperature at which the shape memory alloy element actuates, thereby causing movement of the valve between first and second positions, when the shape memory alloy element cools to below the threshold temperature, the shape memory alloy element causes the valve to be in an open position using a negative differential spring.

14. The valve of claim 13, wherein the fluid flow restraining member is pivotable between the closed position and the open position.

15. The valve of claim 13, wherein the sensor is a flowrate sensor, a flow direction sensor, a conductivity sensor, a pressure sensor, or a temperature sensor.

16. The valve of claim 13, wherein the sensor is selected from a group of sensors consisting of:

a flowrate sensor;

a flow direction sensor;

a conductivity sensor;

a pressure sensor; and a temperature sensor.

17. The valve of claim 13, further comprising a circuit electrically connected between the sensor and the power supply, the circuit configured to electrically connect the power supply across the shape memory alloy element based on detection of the fluid by the sensor.

18. The valve of claim 17, wherein the circuit includes a supercapacitor electrically connected in parallel with the shape memory alloy element.

* * * * *